(12) United States Patent
Erhel (10) Patent No.: US 10,427,794 B2
(45) Date of Patent: Oct. 1, 2019

(54) AIRCRAFT DIVAN CONVERTIBLE INTO A BED

(71) Applicant: Bombardier Inc., Dorval (CA)

(72) Inventor: Philippe Andre Eugene Erhel, Montreal (CA)

(73) Assignee: BOMBARDIER INC., Dorval (CA)

(*) Notice: Subject to any disclaimer, the term of this patent is extended or adjusted under 35 U.S.C. 154(b) by 107 days.

(21) Appl. No.: 15/108,030

(22) PCT Filed: Dec. 19, 2014

(86) PCT No.: PCT/IB2014/067168
§ 371 (c)(1),
(2) Date: Jun. 24, 2016

(87) PCT Pub. No.: WO2015/097630
PCT Pub. Date: Jul. 2, 2015

(65) Prior Publication Data
US 2016/0325838 A1     Nov. 10, 2016

Related U.S. Application Data

(60) Provisional application No. 61/921,256, filed on Dec. 27, 2013.

(51) Int. Cl.
*B64D 11/06* (2006.01)
*B60N 2/34* (2006.01)
(Continued)

(52) U.S. Cl.
CPC ............ *B64D 11/0641* (2014.12); *B60N 2/34* (2013.01); *A47C 17/17* (2013.01); *B61D 33/00* (2013.01);
(Continued)

(58) Field of Classification Search
CPC ........ B64D 11/0641; B64D 2011/0069; B60N 2/34; B61D 31/00; B61D 33/00;
(Continued)

(56) References Cited

U.S. PATENT DOCUMENTS 2,320,614 A    6/1943  Kleine
2,504,645 A *  4/1950  Burnett .................. A47C 17/16
                                                            105/315
(Continued)

FOREIGN PATENT DOCUMENTS

CN         2774850 Y      4/2006
EP         1116654 A2     7/2001
(Continued)

OTHER PUBLICATIONS

PCT international Search Report and Written Opinion dated Mar. 2, 2015 re: International Application No. PCT/IB2014/067168.
(Continued)

*Primary Examiner* — David R Dunn
*Assistant Examiner* — Tania Abraham
(74) *Attorney, Agent, or Firm* — Norton Rose Fulbright Canada LLP (57) ABSTRACT

An aircraft divan includes a lateral bracket connecting between front and rear legs with lateral bracket front and rear ends, a first track defined by the lateral bracket between the lateral bracket front and rear ends, an upright, having upright top and bottom ends, a second track defined by the upright between the upright top and bottom ends, a seat pan having seat pan front and rear ends, the seat pan being slidingly connected to the first track adjacent to the seat pan rear end, and a backrest having backrest top and bottom ends, the backrest being slidingly connected to the second track adjacent to the backrest top end. The seat pan rear end is pivotably connected to the backrest adjacent to the back- (Continued)

rest bottom end such that movement of the seat pan is transmitted to the backrest so as to move together between upright and berth positions.

51 Claims, 6 Drawing Sheets

(51) Int. Cl.
| | | |
|---|---|---|
| *A47C 17/17* | (2006.01) | |
| *B61D 33/00* | (2006.01) | |
| *B61D 11/00* | (2006.01) | |
| *B64D 11/00* | (2006.01) | |

(52) U.S. Cl.
CPC ....... *B64D 2011/0069* (2013.01); *Y02T 50/46* (2013.01)

(58) Field of Classification Search
CPC ... A47C 17/17; A47C 17/175; A47C 17/1753; A47C 17/34
USPC .................................................. 297/343, 318
See application file for complete search history.

(56) References Cited

U.S. PATENT DOCUMENTS

| | | | | |
|---|---|---|---|---|
| 2,953,103 | A * | 9/1960 | Bohannon | B61D 31/00 105/315 |
| 3,567,280 | A * | 3/1971 | Bradshaw | A47C 1/03294 297/318 |
| 4,018,166 | A * | 4/1977 | Gutridge | B61D 1/08 105/316 |
| 4,217,669 | A | 8/1980 | Fefferman | |
| 4,321,716 | A * | 3/1982 | Shrock | A47C 17/1756 5/18.1 |
| 4,731,888 | A | 3/1988 | Bridges | |
| 4,737,996 | A | 4/1988 | Tiffany | |
| 5,187,820 | A * | 2/1993 | Froutzis | A47C 17/1756 5/37.1 |
| 5,271,109 | A | 12/1993 | Markel et al. | |
| 5,454,624 | A * | 10/1995 | Anglade | B60N 2/0292 297/321 |
| 5,787,522 | A | 8/1998 | Swihart | |
| 5,860,702 | A | 1/1999 | Pilarczyk et al. | |
| 5,921,629 | A | 7/1999 | Koch et al. | |
| 5,992,798 | A * | 11/1999 | Ferry | A47C 1/0352 105/316 |
| 6,604,471 | B1 | 8/2003 | Tarver, Jr. | |
| 6,742,840 | B2 * | 6/2004 | Bentley | B60N 2/22 297/316 |
| 7,195,316 | B2 * | 3/2007 | Shimasaki | A47C 7/024 297/284.11 |
| 7,252,340 | B2 * | 8/2007 | Johnson | B64D 11/0015 297/411.31 |
| 7,390,060 | B2 * | 6/2008 | Kristen | A47C 1/0352 297/341 |
| 8,196,236 | B2 | 6/2012 | Smythe | |
| 8,226,163 | B1 | 7/2012 | Pearson et al. | |
| 8,272,694 | B2 * | 9/2012 | Hawkins | B60N 2/181 297/317 |
| 8,303,036 | B2 * | 11/2012 | Hankinson | B64D 11/06 297/317 |
| 8,522,163 | B2 | 8/2013 | Relyea et al. | |
| 2001/0000639 | A1 | 5/2001 | Park et al. | |
| 2002/0063449 | A1 * | 5/2002 | Plant | B60N 2/34 297/68 |
| 2003/0080597 | A1 * | 5/2003 | Beroth | A47C 1/0352 297/330 |
| 2004/0080201 | A1 | 4/2004 | Verny et al. | |
| 2009/0205130 | A1 | 8/2009 | Smythe | |

FOREIGN PATENT DOCUMENTS

| | | | | |
|---|---|---|---|---|
| JP | H10147240 | A * | 6/1998 | ............... B60N 2/34 |
| WO | 02051703 | A1 | 7/2002 | |

OTHER PUBLICATIONS

English translation of abstract of Chinese Publication No. CN 2774850 (Y) dated Apr. 26, 2006.
English translation of Chinese Publication No. CN 2774850 (Y) dated Apr. 26, 2006.
The State Intellectual Property Office of the Peoples Republic of China; Office Action dated Feb. 3, 2017 re: Patent Application No. 201480071334.6.
The State Intellectual Property Office of the People's Republic of China; Second Office Action dated Oct. 24, 2017 re: Patent Application No. 201480071334.6.
The State Intellectual Property Office of the People's Republic of China, Notification of a Third Office Action dated Jul. 31, 2018 re: Chinese Patent Application No. 201480071334.6.
Suiter Swantz IP, Protest Pursuant to 37 C.F.R. 1.291 (b)(1), served on Bombardier Inc. on Dec. 1, 2017.
B/E Aerospace, Document 1—Divan, Aug. 26, 2008.
B/E Aerospace, Document 2—Divan, Jun. 25, 2009.
B/E Aerospace, Document 3—Divan, Aug. 25, 2009.
B/E Aerospace, Document 4—Divan, Sep. 28, 2009.
B/E Aerospace, Document 5—Divan, Oct. 1, 2009.
B/E Aerospace, Document 6—Divan Product Presentation, Oct. 3, 2009.
B/E Aerospace, Document 7—Divan, Oct. 14, 2009.
B/E Aerospace, Document 8—Divan Product Presentation, Oct. 19, 2009.
B/E Aerospace, Document 9—Divan Product Presentation, Jan. 26, 2010.
B/E Aerospace, Document 10—Divan Product Brochure, Oct. 12, 2011.
B/E Aerospace, Document 11—Divan Maintenance Manual, Oct. 14, 2011.
B/E Aerospace, Document 12—Divan Product Presentation, Oct. 26, 2011.
Document 13—Affidavit of Ian Webb, Nov. 30, 2017.
Document 14—Affidavit of Michael Oleson, Nov. 30, 2017.

* cited by examiner

AIRCRAFT DIVAN CONVERTIBLE INTO A BED

CROSS-REFERENCE TO RELATED APPLICATION(S)

This application is a national phase application under 35 U.S.C. 371 of International Patent Application No. PCT/IB2014/067168 filed on Dec. 19, 2014, which claims priority from U.S. Provisional Patent Application Ser. No. 61/921,256, filed on Dec. 27, 2013, the entire contents of which are incorporated herein by reference.

FIELD OF THE INVENTION

The present invention concerns furniture for moving vehicles, particularly aircraft. The present invention concerns a divan (also referred to as a couch, lounge, settee or sofa) that may be converted into a bed.

DESCRIPTION OF THE RELATED ART

Modern aircraft are designed to travel considerably longer distances than aircraft in the past. While distances for aircraft have increased, the operational speed of most aircraft has remained relatively unchanged. As a result, while modern aircraft are able to fly to a more remote destination, it takes proportionately longer for the aircraft to reach that further destination.

For such longer flights, passengers prefer flexibility in the configuration of the cabin of the aircraft. In particular, a passenger wishing to sleep may prefer to lie in a prone position rather than remaining in an aircraft seat, even in instances where the aircraft seat may be reconfigured to a prone or nearly prone position. For this reason, among others, aircraft manufacturers have developed different varieties of aircraft furniture positionable in selectable configurations to accommodate passenger preferences.

By way of further background to the present invention, it is noted that in some aircraft, specifically business and private aircraft, it is not uncommon to find one or more seats that are configured as divans, couches, lounges, settees, or sofas (hereinafter collectively referred to as "divans"). Divans may be constructed to accommodate one or more passengers in a side-by-side arrangement.

As should be apparent to those skilled in the art, there are numerous regulations that apply to seating for aircraft to ensure that the seating complies with applicable safety guidelines. These guidelines apply to aircraft seating in each of the various configurations to which the seating is adjustable.

As may be appreciated, within the confines of applicable regulations, there are a number of engineering challenges that arise in connection with the implementation of a divan on an aircraft. Numerous solutions to this problem have been implemented by various aircraft manufacturers for various airplane designs. Other examples have been proposed for other types of vehicles.

One of the challenges associated with furniture for an aircraft concerns the reconfiguring of the furniture such that the furniture avoids immovable obstacles, such as the fuselage wall of the aircraft or an interior bulkhead, among others.

In the prior art, in connection with furniture that is positioned adjacent to a wall, for example, numerous solutions have been proposed.

U.S. Pat. No. 8,226,163 (hereinafter "the '163 patent") describes an aircraft divan, specifically a construction for a leg 100 for an aircraft divan. While not described in the '163 patent, it appears that a seat portion 403 slidingly translates between positions via tracks embedded in side portions thereof, thereby avoiding impact with a wall of other structure behind the divan. (The '163 patent at FIG. 4B.)

U.S. Pat. No. 5,921,629 (hereinafter "the '629 patent") describes one prior art example of a simple aircraft divan that is not configurable between different positions.

U.S. Pat. No. 5,860,702 (hereinafter "the '702 patent") describes a fold-down seat for a motor vehicle. The seat 10 includes a set bottom 12 and a seat back 14. (The '702 patent at col. 3, lines 61-63.) An auxiliary section 20 rotates into place, between the seat back 14 and the seat 12, when the seat back 14 is folded downwardly and the seat portion 12 slides forwardly. (The '702 patent at col. 4, lines 41-52.) As shown in the '702 patent, when in the bed configuration, the seat 12 is separated from the seat back 14 and the auxiliary section 20 lies between them to form the sleeping surface. (The '702 patent at col. 4, lines 55-57.)

U.S. Pat. No. 4,217,669 (hereinafter "the '669 patent") describes a seat that is convertible between a sitting position and a bed position. In particular, the '669 patent describes a seat convertible to a bed where the seat back 18 (with a corresponding cushion 16) and the seat bottom 20 (with a corresponding cushion 14) are pivotally connected to one another and to the base 22 by a coupling 24 that slides along a longitudinally-extending portion 26 of the base 22. (The '669 patent at col. 1, line 64, through col. 2, line 5.) The cushions 14, 16 form the surface of the bed when seat is converted to the bed configuration. (The '669 patent at col. 2, lines 14-17.)

U.S. Pat. No. 8,196,236 (hereinafter "the '236 patent") describes a sofa 10 that converts from a seating configuration to a sleeping configuration. The sofa 10 includes a bottom portion 12, a top portion 13, and two arms 14. (The '236 patent at col. 2, lines 51-57.) The sofa 10 includes a motor 26 that permits the sofa 10 to move between upright and reclined positions. (The '236 patent at col. 1, line 63, through col. 3, line 5.) To facilitate the reconfiguration of the sofa 10, the arms 14 include tracks 30 that guide the movement of respective frame elements. (The '236 patent at col. 3, lines 6-15.)

U.S. Pat. No. 4,737,996 (hereinafter "the '996 patent") describes a seat-bed conversion assembly 10 that may be reconfigured from a seating position to a sleeping position by manipulation of only a single section of the furniture. (The '996 patent at col. 1, lines 44-50.) The seat bed conversion assembly 10 includes arm frames 11 with two sets of tracks 15, 16 formed therein. (The '996 patent at col. 2, lines 7-8.) A drag link 27 connects between a back frame 19 and a subseat 25 so that movement of the back frame 19 also moves the subseat 25. (The '996 patent at col. 2, lines 33-38.) The assembly 10 is converted from a chair to a bed by lifting the front of the seat 23 and pulling it out between the arms, resulting in coaction of the drag link 27 on the back frame 19. (The '996 patent at col. 2, lines 39-42.)

U.S. Pat. No. 5,271,109 (hereinafter "the '109 patent") describes a convertible sofa bed 10 with a seat support 14 and a back support 16. (The '109 patent at col. 1, lines 62-67.) The sofa-bed 10 is shiftable between the sofa position and the bed position when a user pulls on the seat support 14 near the front edge, in the direction of the arrow 76. (The '109 patent at col. 2, lines 39-41.) As the seat support 14 is pulled out, the frame rail 34 pushes against the hook parts 56 of the back support brackets 54 to cause rotation of the back support around the pivot pin 60. (The '109 patent at col. 2, lines 41-44.) The back support 16 consequently transitions to the bed position. (The '109 patent at col. 2, lines 51-58.)

U.S. Pat. No. 6,604,471 (hereinafter "the '471 patent") describes a sofa-bed-counter unit where opposing sofas are convertible into a bed that combines the two sofa beds together. (The '471 patent at FIG. 13.)

Despite these examples, the prior art does not offer a suitable solution for an aircraft divan that is convertible from an upright seating position to a berth orientation.

SUMMARY OF THE INVENTION

The present invention seeks to address one or more of the deficiencies noted with respect to the prior art.

Specifically, the present invention provides a divan for an aircraft that may accommodate person(s) thereon in a seated manner. The divan may be converted to a bed that accommodates passengers (or crew members) by providing a convenient sleeping area within the aircraft cabin.

It is, therefore, one aspect of the present invention to provide a divan for an aircraft that includes at least one front leg connectable to a structure of the aircraft, at least one rear leg connectable to the structure of the aircraft, at least one lateral bracket connecting between the front leg and to the rear leg, the lateral bracket having a lateral bracket front end and a lateral bracket rear end, a first track defined by the lateral bracket between the lateral bracket front end and the lateral bracket rear end, at least one upright, having an upright top end and an upright bottom end, a second track defined by the upright between the upright top end and the upright bottom end, a seat pan having a seat pan front end and a seat pan rear end, the seat pan being slidingly connected to the first track adjacent to the seat pan rear end, and a backrest having a backrest top end and a backrest bottom end, the backrest being slidingly connected to the second track adjacent to the backrest top end. The seat pan rear end is pivotably connected to the backrest adjacent to the backrest bottom end such that movement of the seat pan is transmitted to the backrest so as to move together between an upright position and a berth position.

In one contemplated embodiment, the upright bottom end is connected to the lateral bracket rear end.

In another contemplated embodiment, the first track defines at least three seating positions, an upright seating position for taxi, take-off, and landing, a slouch position, and a berth position. In association with this embodiment, it is contemplated that the first track is essentially V-shaped with a first end defining the upright seating position, an intermediate dip defining the slouch position, and a second end defining the berth position. Moreover, it is contemplated that a position of the rear end of the seat pan follows the shape of the first track.

In still another contemplated embodiment, the divan includes at least one front seat bracket pivotally connected adjacent to the lateral bracket front end, the front seat bracket slidingly engaging a third track extending between the seat pan front and the seat pan rear end, at least one rear seat bracket connected, at a first end, adjacent to the seat pan rear end and, at a second end, slidingly engaging the first track.

Additional embodiments of the divan of the present invention contemplate the inclusion of least one backrest bracket, at one end, being connected adjacent to the backrest top end and, at the other end, slidingly engaging the second track.

In addition, it is contemplated that the at least one lateral bracket may be a pair of lateral brackets spaced apart from one another.

Further, the at least one upright may be a pair of uprights spaced apart from one another.

Still further, the at least one front seat bracket may be a pair of front seat brackets spaced apart from one another.

Yet further, the at least one rear seat bracket may be a pair of rear seat brackets spaced apart from one another.

In connection with one embodiment of the divan of the present invention, it is contemplated that the upright seating position is defined by the backrest at an angle between about 10-20° from a vertical line perpendicular to a floor of the aircraft and is defined by the seat at an angle between about 0-10° from a horizontal line parallel to the floor. Alternatively, the upright seating position is defined by the backrest at an angle between about 12.5-17.5° from a vertical line perpendicular to the floor and is defined by the seat at an angle between about 2.5-7.5° from a horizontal line parallel to the floor. In a further alternative, the upright seating position is defined by the backrest at an angle between about 15° from a vertical line perpendicular to the floor and is defined by the seat at an angle between about 5° from a horizontal line parallel to the floor.

In connection with another embodiment of the divan of the present invention, it is contemplated that the upright seating position is defined by the backrest at an angle between about 19-29° from a vertical line perpendicular to a floor of the aircraft and is defined by the seat at an angle between about 0-10° from a horizontal line parallel to the floor. Alternatively, the upright seating position is defined by the backrest at an angle between about 21.5-26.5° from a vertical line perpendicular to the floor and is defined by the seat at an angle between about 2.5-7.5° from a horizontal line parallel to the floor. In a further alternative, the upright seating position is defined by the backrest at an angle between about 24° from a vertical line perpendicular to the floor and is defined by the seat at an angle between about 5° from a horizontal line parallel to the floor.

Also in connection with embodiments of the present invention, it is contemplated that the slouch seating position is defined by the backrest at an angle between about 12.5-22.5° from a vertical line perpendicular to the floor and is defined by the seat at an angle between about 5-15° from a horizontal line parallel to the floor. In one variation, the slouch seating position is defined by the backrest at an angle between about 15-20° from a vertical line perpendicular to the floor and is defined by the seat at an angle between about 7.5-12.5° from a horizontal line parallel to the floor. In a further alternative, the slouch seating position is defined by the backrest at an angle between about 17.5° from a vertical line perpendicular to the floor and is defined by the seat at an angle between about 10° from a horizontal line parallel to the floor.

A variant of the slouch position also forms a part of the present invention. In this variant, it is contemplated that the slouch seating position is defined by the backrest at an angle between about 30-40° from a vertical line perpendicular to the floor and is defined by the seat at an angle between about 5-15° from a horizontal line parallel to the floor. In one further variation, the slouch seating position is defined by the backrest at an angle between about 32.5-37.5° from a vertical line perpendicular to the floor and is defined by the seat at an angle between about 7.5-12.5° from a horizontal line parallel to the floor. In a further alternative, the slouch seating position is defined by the backrest at an angle between about 35° from a vertical line perpendicular to the floor and is defined by the seat at an angle between about 10° from a horizontal line parallel to the floor.

Another embodiment of the divan of the present invention contemplates that the seat includes a seat cushion disposed on the seat pan.

A further contemplated embodiment provides that the backrest include a backrest plate and a backrest cushion disposed on the backrest plate.

One further embodiment of the divan of the present invention contemplates that the front and rear legs are connectable to seating tracks disposed within the floor.

Other aspects and features of the present invention will be made apparent from the discussion that follows, as should be understood by those skilled in the art.

BRIEF DESCRIPTION OF THE DRAWINGS

The present invention will now be described in connection with the drawings appended hereto, in which.

DETAILED DESCRIPTION OF EMBODIMENT(S) OF THE INVENTION

The present invention will now be described in connection with one or more contemplated embodiments. The embodiments that are described are intended to be exemplary of the present invention and not limiting of the scope thereof. In other words, while attention is focused on specific embodiments of the present invention, those embodiments are not intended to limit the present invention. To the contrary, the embodiments are intended to be exemplary of the breadth and scope of the present invention. Any discussion, therefore, of specific embodiments is not intended to be limiting of the present invention.

As noted above, the divan of the present invention is intended for installation on smaller diameter jet aircraft of the type commonly purchased by corporations and individuals. While it is contemplated that the present invention will be employed as furniture on these smaller diameter aircraft, the present invention is not intended to be limited solely to such an environment. It is envisioned that the divan of the present invention may be employed on any size aircraft.

In the alternative, it is contemplated that the divan of the present invention may be employed in other types of vehicles including, but not limited to, boats, vans, trains, trucks, recreational vehicles, etc. Accordingly, the divan of the present invention should not be understood as being limited for use in only one potential environment.

With respect to the embodiments described herein, specific materials are discussed for the various elements of the divan of the present invention. Any discussion of a particular material is intended to be exemplary of the types of materials that may be employed and is not intended to be limiting of the present invention. Other materials may be used for the construction of the divan of the present invention without departing from the scope of the present invention.

In addition, it is noted that the divan 10 of the present invention is mechanically operated. In other words, the divan 10 is intended to be manipulated manually between the first, second, and third positions (e.g., between the upright seating (or TTOL), napping (or slouch), and berth (or berthed) orientations). A manually manipulated divan 10 offers an advantage in that the divan 10 is light in weight, because it does not incorporate electrical motors and/or pneumatic equipment to assist with transitioning the divan between the seating orientation and the berth orientation. A mechanical operation for the divan 10 also is contemplated to contribute to a construction that operates reliably for the operational lifetime of the divan 10.

While a mechanical operation offers a light weight construction, which is beneficial for aircraft where any additional weight potentially reduces the flight range for the aircraft, electrical, pneumatic, mechanical, electro-mechanical, hydraulic, electro-hydraulic, and other types of actuators and/or devices may be incorporated into the divan 10 without departing from the scope of the present invention. In other words, the present invention should not be understood to be limited solely to a mechanically operated divan 10, because any of a number of different types of actuators and/or other devices may partially or wholly power the operation of the divan 10.

With respect to the divan 10, it is noted that the divan 10 may be sized to accommodate one or more passengers in a side-by-side arrangement. In other words, the divan 10 may be sized so that two persons may sit together on the divan 10 in any of its positional configurations.

Figure 1:
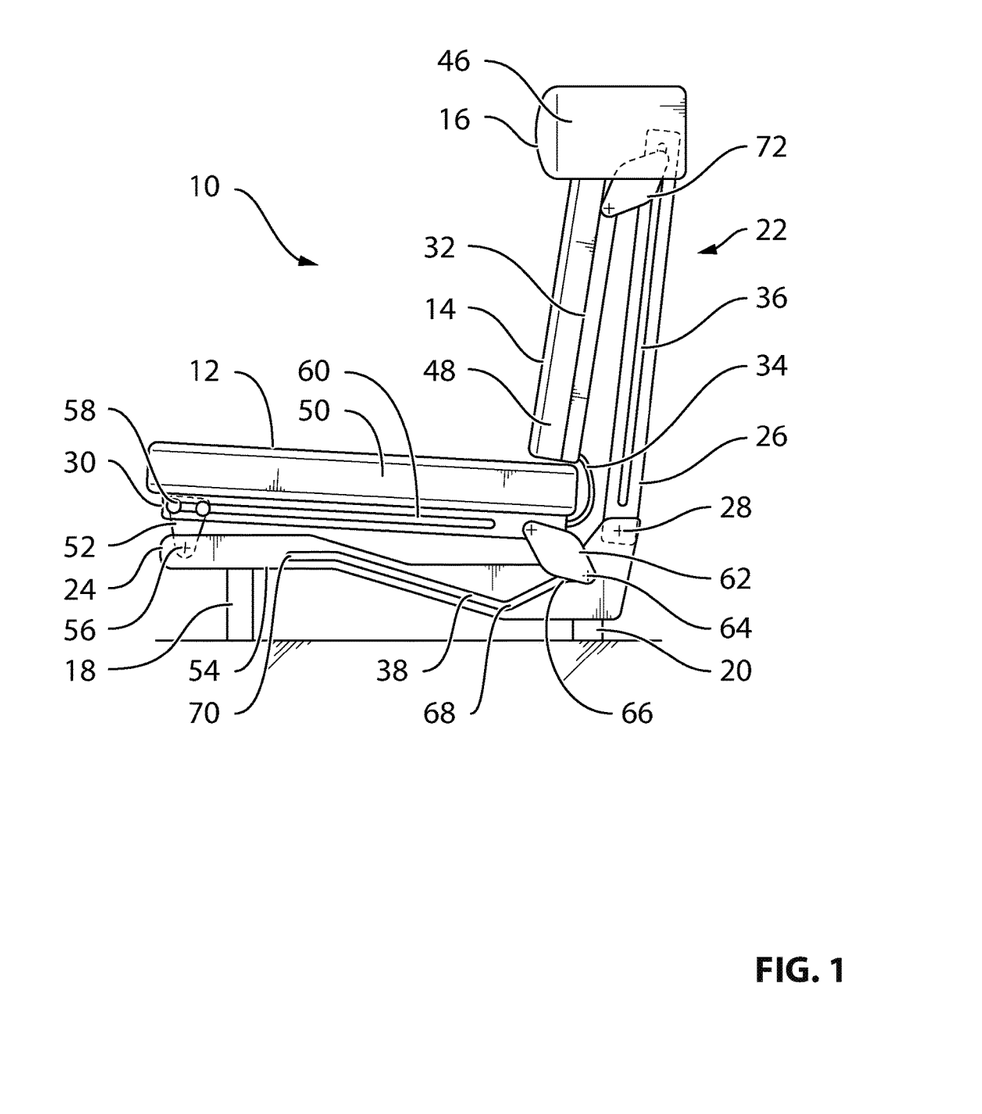
FIG. 1 is a graphical side view of one contemplated embodiment of the divan of the present invention, shown in a first seat position referred to as the upright position or the taxi, take-off, and landing ("TTOL") position.

FIG. 1 is graphical side view of one contemplated embodiment of the divan 10 of the present invention. The divan 10 includes a seat 12, a backrest 14, and a headrest 16. The seat 12 is supported by one or more legs, including a forward pair of legs 18 and a rear pair of legs 20. The legs 18, 20 may be connected to one another via one or more cross-braces and supports, as required or as desired.

In a contemplated alternative, the divan 10 may include left and right armrests (not shown). As should be apparent to those skilled in the art, armrests are not required to practice the present invention. A divan 10, therefore, may include or exclude armrests without departing from the scope of the present invention.

As also should be apparent from FIG. 1, the seat 12, the backrest 14, and the headrest 16 (along with other components) are contemplated to be covered in upholstery. The upholstery may be fabric, leather, or any other material selected to compliment the décor within the aircraft interior. The composition of the upholstery is not critical to the present invention, as should be apparent to those skilled in the art.

As illustrated in FIG. 1, the divan 10 includes a frame 22 that supports the seat 12, the backrest 14, and the headrest 16. The frame 22 includes an undercarriage 24 that extends between the front legs 18 and the rear legs 20. The frame 22 also includes a rear carriage 26 that is connected to the undercarriage 24 via one or more fasteners 28. It is also contemplated that the rear carriage 26 may not be connected to the undercarriage 24 in alternative embodiments to the divan 10 described herein. For example, the rear carriage 26 may be connected to one or more elements of the divan 10. In still other contemplated embodiments, the rear carriage 26 may be separate from the undercarriage 24 and may be connected to structural components associated with the aircraft or other vehicle in which the divan 10 is placed.

As should be apparent to those skilled in the art, the flight range (or "range") of an aircraft is a function of the distance that an aircraft may fly, when fully loaded, as measured from a point of origin. The range of an aircraft is dependent upon a number of variables that include, but is not limited to, the weight of the aircraft, its fuel capacity, and its maximum allowable take-off weight. As the weight of the aircraft increases, the range of the aircraft decreases. Since the take-off weight of an aircraft places an upper limit on the aircraft, there is a limited amount of fuel that the aircraft may take on and remain within its take-off limit. It is also noted aircraft also have a maximum zero fuel weight limit. Therefore, any added weight (in the form of furniture) adversely affects the payload capacity of that aircraft.

For purposes of increasing the range of an aircraft, it is contemplated that the divan 10 will be constructed from light-weight materials. For example, the frame 22 of the divan 10 may include structural components that are made primarily from aluminum and/or alloys of aluminum. As should be apparent to those skilled in the art, aluminum is both strong and lightweight, making it suitable for the construction of many aspects of the divan 10. Aluminum and its alloys, however, are not the only materials that may be employed. Other materials including iron, alloys of iron, magnesium, alloys of magnesium, beryllium, alloys of beryllium, composite materials (including carbon fiber composite materials, plastics, thermoplastics, ceramics, etc.), may be employed for one or more of the elements or components of the frame 22 without departing from the scope of the present invention. Therefore, while aluminum and its alloys are anticipated to be employed for most components, the present invention is not limited thereto.

The frame 22 of the divan 10 also includes a seat pan 30. The seat pan 30 supports the seat 12. Similarly, the backrest 14 also includes a backrest plate 32, which is considered to be a part of the frame 22.

The seat undercarriage 24 is contemplated to include lateral, seat-supporting, frame brackets 54 on either side. The frame brackets 54 are contemplated to connect to one another at respective front and rear ends by suitable connecting rods (not shown). Alternatively, the frame brackets 54 may be manufactured such that they are part of a unitary component that forms at least a part of the undercarriage 24 without departing from the scope of the present invention. Together, the lateral brackets 54 (and any connecting rods form the seat undercarriage 24) are supported at the front end by the front legs 18 and at the rear end by the rear legs 20. For stability, braces (not shown) may connects the bottom of each front leg 18 to the top of each rear leg 20. Similarly a rear brace (not shown) may connect, at a diagonal, between the rear legs 20 (or between one rear leg 20 and an opposing bracket forming the seat undercarriage 24).

With continued reference to FIG. 1, the backrest plate 32 connects to the seat pan 30 via two brackets 34. The brackets 34 may have any construction suitable for the divan 10. As will be made apparent from the discussion that follows, the brackets 34 ensure that the seat 12 and the backrest 14 move together as the divan 10 transitions from the TTOL position to the berthed position.

The brackets 34 may be constructed in any manner suitable to connect the seat pan 30 to the backrest plate 32. In one contemplated embodiment, the brackets are solid arms made from aluminum or any other suitable material. In another contemplated embodiment, the brackets 34 may be flexible straps that connect between the seat pan 30 and the backrest plate 32. The exact construction of the brackets 34 is not considered to be critical to the construction and operation of the divan 10 of the present invention.

So that the divan 10 may transition from the upright seating orientation to the berth orientation, the operation of which is discussed in greater detail below, the top end of the backrest plate 32 engages a backrest track 36 (also referred to as a "keyway") in the vertical supports forming the rear carriage 26. Similarly, the seat pan 30 engages a bracket track 38, which is disposed in the lateral brackets 54 forming the seat undercarriage 24. Together with other features, the tracks 36, 38 permit the backrest plate 32 and the seat pan 30 to slide with respect to the remainder of the seat frame 22.

Figure 4:
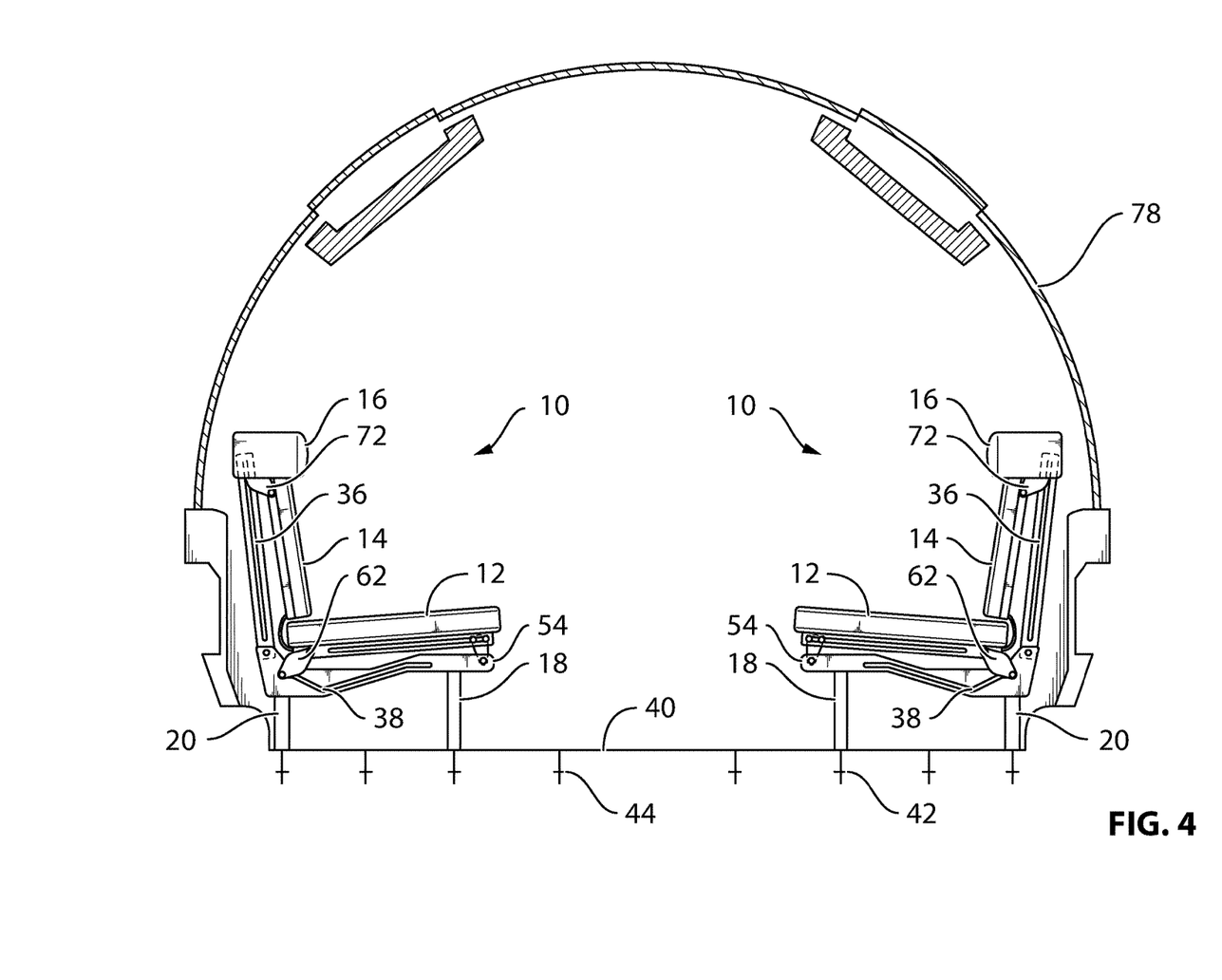
FIG. 4 is a graphical, cross-section of an aircraft including two divans according to the embodiment illustrated in FIGS. 1-3, the divans facing one another, both being arranged in the TTOL position.
Figure 5:
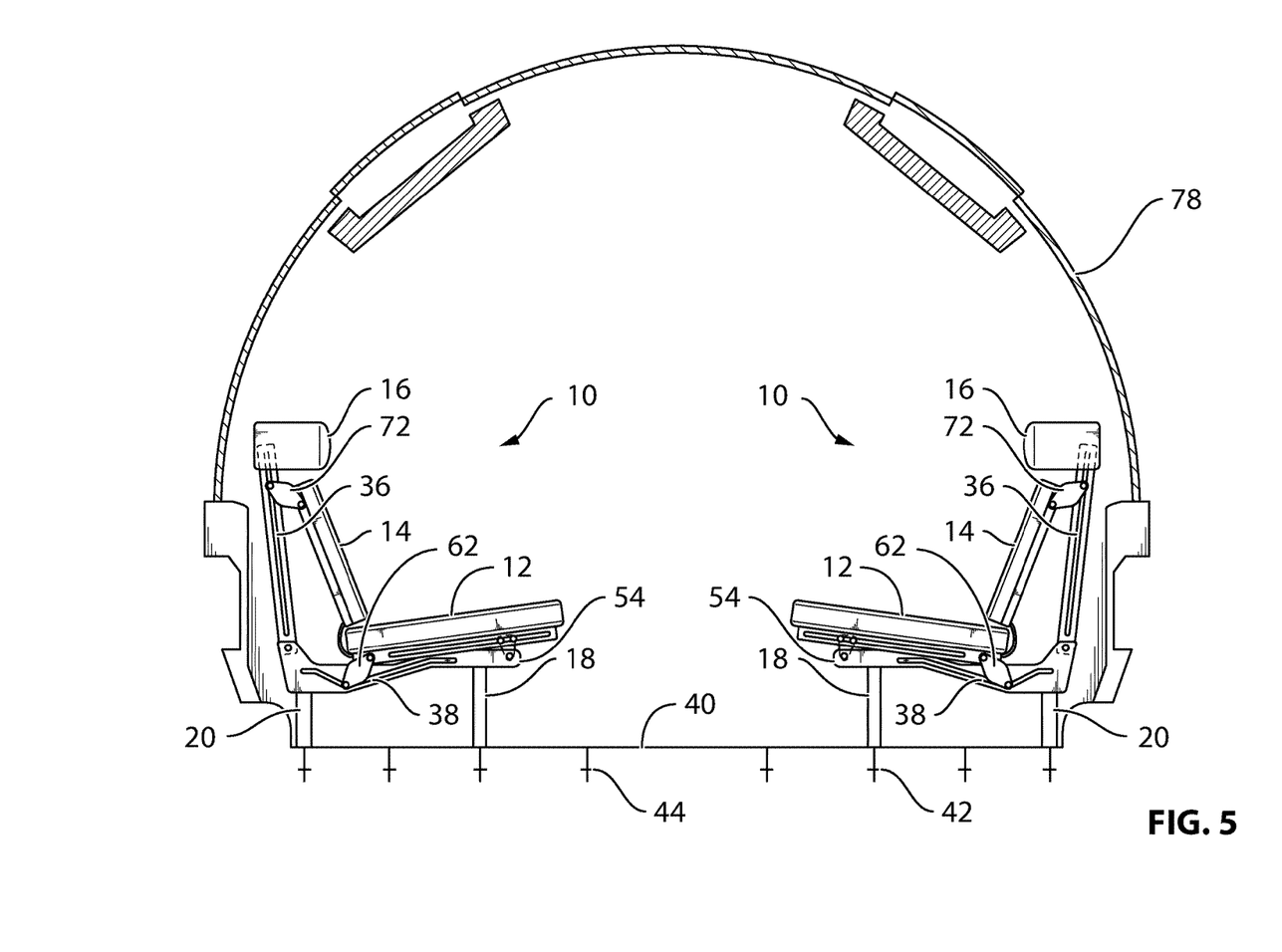
FIG. 5 is a graphical side view of the aircraft shown in FIG. 4, with the two divans being arranged in the napping (or slouch) position.
Figure 6:
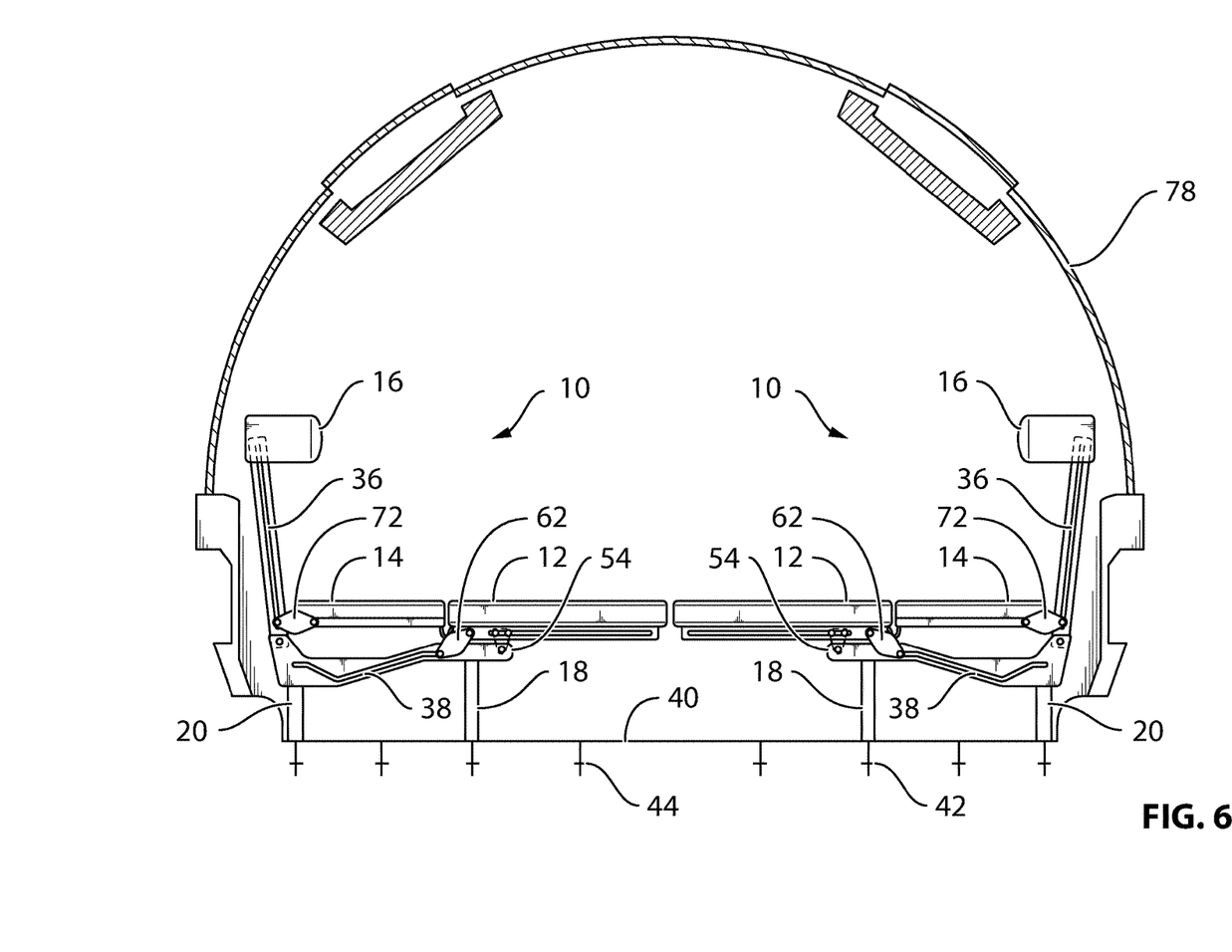
FIG. 6 is a graphical, side view of the aircraft shown in FIG. 4, with the two divans being arranged in the berthed position.

As illustrated in FIGS. 4-6, the divan 10 may be attached to the floor 40 of the cabin of an aircraft via one or more connectors 42. Specifically, the connectors 42 attach to tracks 44 that are embedded in the floor 40 of the cabin of the aircraft. Those skilled in the art should understand the construction of the connectors 42. Accordingly, further details concerning the connectors 42, and their attachment to the tracks 44, are not provided here.

As shown in FIG. 1, for example, the headrest 16 is covered with a headrest cushion 46 that is disposed atop the rear carriage 26. The backrest plate 32 is covered by a backrest cushion 48. As should be apparent from FIG. 1, the backrest plate 32 and the backrest cushion 48 form the backrest 14 of the present invention. The seat pan 30 is covered by a seat cushion 50. Together, the seat pan 30 and the seat cushion 50 form the seat 12.

As also illustrated in FIG. 1, the divan 10 includes a forward seat bracket 52, which pivotally connects to the lateral bracket 54 at a pivot 56. Specifically, the bottom of the forward seat bracket 52 pivotally connects to the lateral bracket 54. The top end of the forward seat bracket 52 slidingly connects to the seat pan 30 via one or more rollers 58 in a seat pan track 60. The pivot 56 for the forward seat bracket 52 permits the forward seat bracket 52 to pivot as the divan 10 transitions from the upright seating orientation to the berth orientation, thereby permitting the seat pan 30 to be placed in one or more angular orientations with respect to a horizontal reference frame.

The divan 10 also includes a rear seat bracket 62. At its top end, the rear seat bracket 62 is attached adjacent to a rear end of the seat pan 30. At its bottom end, the rear seat bracket 62 slidingly engages the bracket track 38 in the lateral bracket 54. A pivot 64 is provided for engagement in the bracket track 38. The same arrangement is provided on either side of the seat 12 with respect to both lateral brackets 54.

As illustrated in FIG. 1, the bracket track 38 displays a V-shape. When the divan 10 is in the upright seated position for taxi, take-off, and landing, the pivot 64 is located at the first end 66 of the bracket track 38. When the divan 10 is in the napping or slouched position, the pivot 64 is located in the intermediate position 68 of the bracket track 38. When the divan 10 is configured in the berth position, the pivot 64 is located at the second end 70 of the bracket track 38.

The V-shape of the bracket track 38 facilitates transition of the divan 10 between the three enumerated positions, because the bracket track 38 provides the three positions 66, 68, 70 commensurate with the three positions of the divan 10. It is contemplated that a person will pull on the front of the seat 12 to lower the seat from the TTOL position to the napping position. As the seat 12 slides outwardly, the backrest 14 follows the seat 12, via the brackets 34. The seat 14, in turn, is connected to the backrest track 36 so that the orientation of the backrest 14 changes as the seat 12 slides outwardly. As should be apparent, pushing on the seat 12 reverses this operation.

Figure 2:
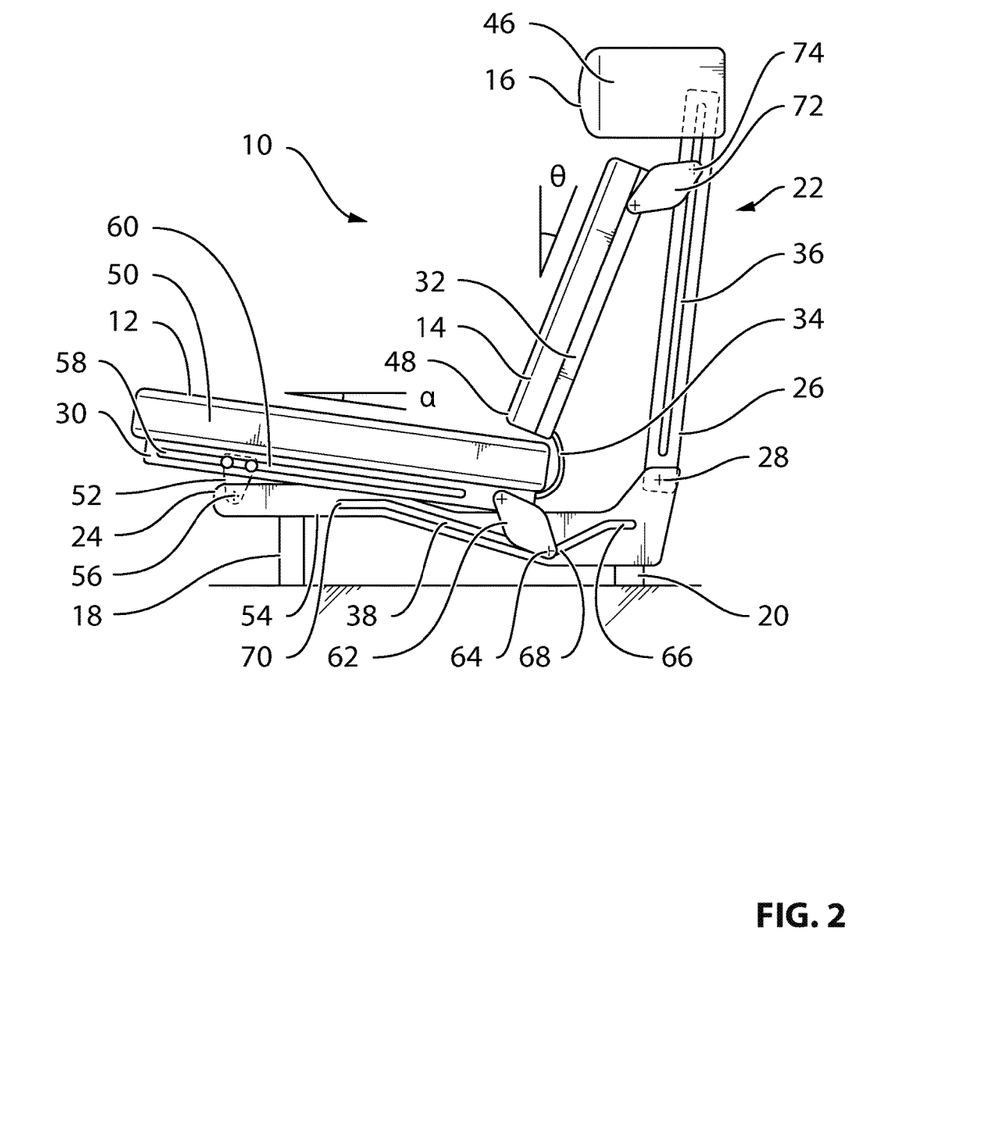
FIG. 2 is a graphical, side view of the embodiment of the divan of the present invention shown in FIG. 1, with the divan being illustrated in a second position, referred to as the "napping" position or the "slouch" position.
Figure 3:
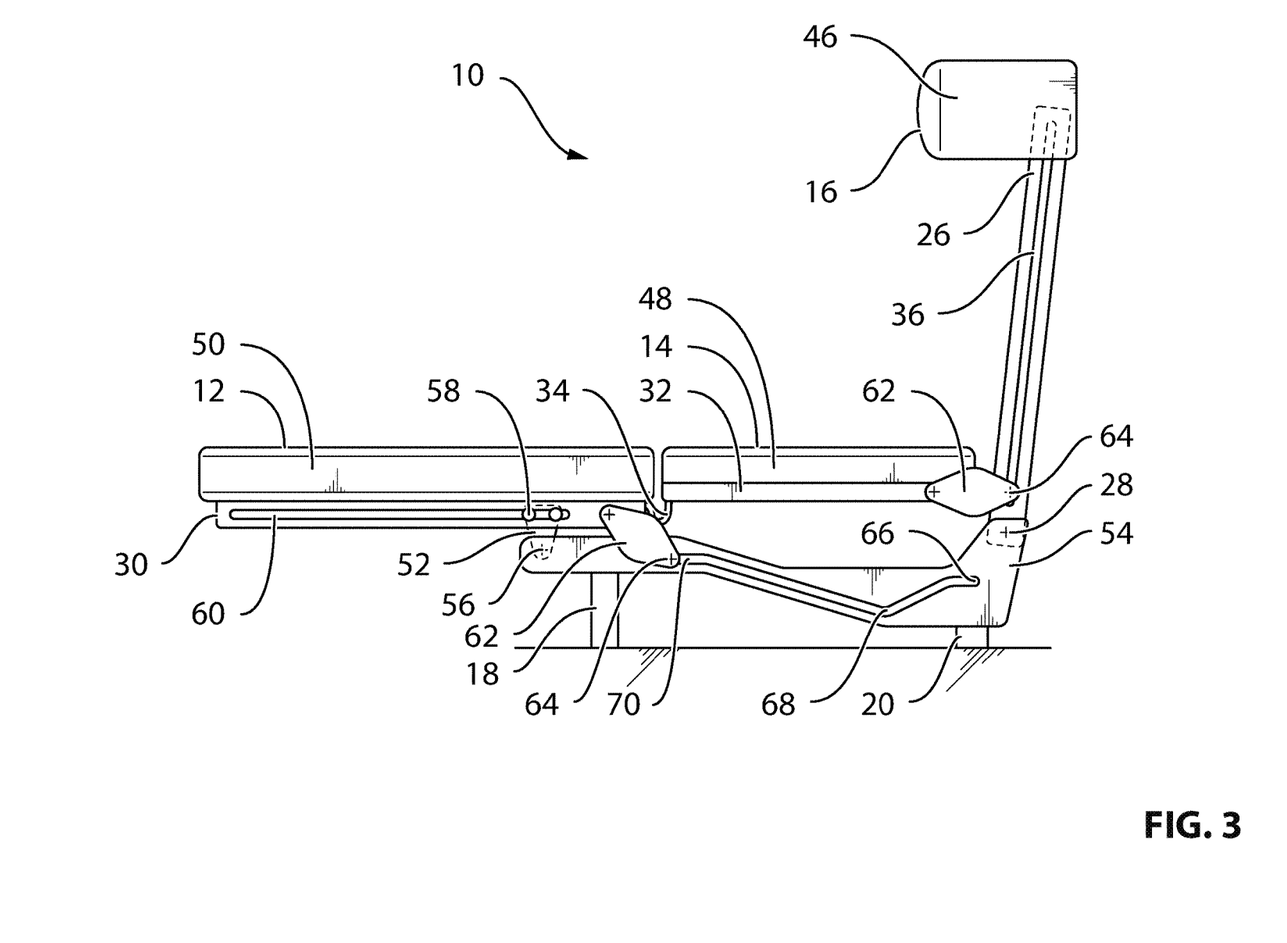
FIG. 3 is a graphical, side view of the divan of the present invention shown in FIG. 1, with the divan being illustrated in a third position, referred to as the "berthed" position or the "berth" position.

With reference to FIGS. 1-3, a backrest bracket 72 is attached to the backrest plate 32. The backrest bracket 72 includes a pivot 74 that engages the backrest track 36, permitting the backrest 14 to slide adjacent to the rear carriage 26.

FIG. 2 illustrates the divan 10 when configured in the napping or slouch position. As is apparent from this illustration, the pivot 64 of the rear seat bracket 62 has transitioned to the intermediate position 68 in the bracket track 38.

FIG. 3 illustrates the divan 10 after it has transitioned to the berth position. In this view, the pivot 64 of the rear seat bracket 62 has transitioned to the second end 70 of the bracket track 38.

FIGS. 4-6 illustrate a configuration for an aircraft where two divans 10 are positioned within the aircraft interior such that the divans 10 face one another. In FIG. 4, the divans 10 are in the upright seating (TTOL) orientations. In FIG. 5, the divans 10 have been reconfigured to the napping or slouch orientation. In FIG. 6, the divans are in the berth orientation. As shown in FIG. 6, it is contemplated that two divans 10 may be positioned within the aircraft such that they form a bed 76 that extends across the width of the fuselage 78.

As may be apparent from the drawings, the divan 10 may be repositioned into one of three positions: (1) the upright seating position (or TTOL position), (2) the slouch (or napping) position, and (3) the berth (or berthed) position. The upright seating position is defined by the backrest 14 being substantially upright with the seat 12 being substantially horizontal.

In the context of one contemplated embodiment of the present invention, the upright seating position may be defined as a position of the backrest 14 and seat 12 where the seat 12 is disposed at an angle α of about 5° from a horizontal position parallel to the floor 40 of the aircraft. In other words, the seat 12 angles such that the rear end is lower than the front end. In the upright seating position, the backrest 14 is at an angle θ of about 15° from a vertical position that is perpendicular to the floor 40. In another contemplated embodiment, the seat 12 is at an angle α lies within a range of about 2.5-7.5° and the backrest is disposed at an angle θ of about 12.5-17.5°. In a further contemplated embodiment, the angle α is between about 0-10° and the angle θ is between about 10-20°.

The present invention also encompasses at least one variant of the upright seating position. In particular, the upright seating position may be defined specifically as a position of the backrest 14 and seat 12 where the seat 12 is disposed at an angle α of about 5° from a horizontal position parallel to the floor 40 of the aircraft. In this variant upright seating position, the backrest 14 is at an angle θ of about 24° from a vertical position that is perpendicular to the floor 40. In another contemplated embodiment, the seat 12 is at an angle α lies within a range of about 2.5-7.5° and the backrest is disposed at an angle θ of about 21.5-26.5°. In a further contemplated embodiment, the angle α is between about 0-10° and the angle θ is between about 19-29°.

In the context of the present invention, the napping or slouch position may be defined specifically as a position of the backrest 14 and seat 12 where the seat 12 is disposed at an angle α of about 10° from a horizontal position parallel to the floor 40 of the aircraft. In the slouch position, the backrest 14 is at an angle θ of about 17.5° from a vertical position that is perpendicular to the floor 122. In another contemplated embodiment, the seat 12 is at an angle α lies within a range of about 7.5-12.5° and the backrest is disposed at an angle θ of about 15-20°. In a further contemplated embodiment, the angle α is between about 5-15° and the angle θ is between about 12.5-22.5°.

The present invention also encompasses at least one variant for the napping or slouch position. In the contemplated variant, the napping or slouch position may be defined specifically as a position of the backrest 14 and seat 12 where the seat 12 is disposed at an angle α of about 10° from a horizontal position parallel to the floor 40 of the aircraft. In the slouch position, the backrest 14 is at an angle θ of about 35° from a vertical position that is perpendicular to the floor 122. In another contemplated embodiment, the seat 12 is at an angle α lies within a range of about 7.5-12.5° and the backrest is disposed at an angle θ of about 32.5-37.5°. In a further contemplated embodiment, the angle α is between about 5-15° and the angle θ is between about 30-40°.

In the context of the present invention, the berth position is one where the seat 12 and the backrest 14 are both parallel (or substantially parallel) to the floor 40. Following the conventions adopted above, this means that the angle α is about 0° and the angle θ is about 90°. While it is contemplated that the berth position may not be exactly parallel to the floor 40, it is contemplated that the angle α would not exceed 0±5° or that the angle θ would not exceed 90±5°. In other words, it is preferred for the seat 12 and the backrest 14 to be as horizontal as practicable with reference to the floor 40. A variation of not more than ±1-2° from horizontal is considered optimal.

As noted above, the present invention is not intended to be limited to any of the embodiments described herein. To the contrary, the enumerated embodiments are intended to be exemplary of the scope of the present invention. In addition, it is noted that features from one embodiment of the present invention may be incorporated into other embodiments, interchangeably, without departing from the scope of the present invention.

What is claimed is:

1. A divan for a vehicle, comprising:
   an undercarriage comprising at least one lateral bracket, the lateral bracket having a lateral bracket front end and a lateral bracket rear end;
   a seat pan having a seat pan front end and a seat pan rear end, the seat pan comprising a first track extending between the seat pan front end and the seat pan rear end of the seat pan;
   at least one forward seat bracket pivotally connected adjacent to the lateral bracket front end and slidingly engaging the first track;
   at least one upright, having an upright top end and an upright bottom end;
   a second track defined by the upright between the upright top end and the upright bottom end;
   a third track defined by the lateral bracket between the lateral bracket front end and the lateral bracket rear end; and a backrest having a backrest top end and a backrest bottom end, the backrest being slidingly connected to the second track adjacent to the backrest top end, wherein the seat pan is slidingly connected to the third track adjacent to the seat pan rear end, the forward seat bracket pivots upon displacement of the seat pan between a divan upright seating position and a divan slouch seating position, and the seat pan rear end is pivotally connected to the backrest adjacent to the backrest bottom end such that movement of the seat pan is transmitted to the backrest so as to move together between the upright seating position and the slouch seating position.

2. The divan of claim 1, wherein the upright bottom end is connected to the lateral bracket rear end.

3. The divan of claim 1, wherein the third track defines at least three seating positions, the upright seating position for taxi, take-off, and landing, the slouch seating position, and a berth seating position.

4. The divan of claim 3, wherein the third track is essentially V-shaped with a first end defining the upright seating position, an intermediate dip defining the slouch seating position, and a second end defining the berth seating position.

5. The divan of claim 4, wherein a position of the rear end of the seat pan follows the shape of the third track.

6. The divan of claim 3, wherein the upright seating position is defined by the backrest at an angle between about 19-29° from a vertical line perpendicular to a floor of the aircraft and is defined by the seat at an angle between about 0-10° from a horizontal line parallel to the floor.

7. The divan of claim 6, wherein the upright seating position is defined by the backrest at an angle between about 21.5-26.5° from a vertical line perpendicular to the floor and is defined by the seat at an angle between about 2.5-7.5° from a horizontal line parallel to the floor.

8. The divan of claim 7, wherein the upright seating position is defined by the backrest at an angle about 24° from a vertical line perpendicular to the floor and is defined by the seat at an angle about 5° from a horizontal line parallel to the floor.

9. The divan of claim 3, wherein the slouch seating position is defined by the backrest at an angle between about 30-40° from a vertical line perpendicular to the floor and is defined by the seat at an angle between about 5-15° from a horizontal line parallel to the floor.

10. The divan of claim 9, wherein the slouch seating position is defined by the backrest at an angle between about 32.5-37.5° from a vertical line perpendicular to the floor and is defined by the seat at an angle between about 7.5-12.5° from a horizontal line parallel to the floor.

11. The divan of claim 10, wherein the slouch seating position is defined by the backrest at an angle about 35° from a vertical line perpendicular to the floor and is defined by the seat at an angle about 10° from a horizontal line parallel to the floor.

12. The divan of claim 1, further comprising:
at least one rear seat bracket connected, at a first end, adjacent to the seat pan rear end and, at a second end, slidingly engaging the third track.

13. The divan of claim 12, wherein the at least one rear seat bracket comprises a pair of rear seat brackets spaced apart from one another.

14. The divan of claim 1, further comprising:
at least one backrest bracket, at one end, being connected adjacent to the backrest top end and, at the other end, slidingly engaging the second track.

15. The divan of claim 1, wherein the at least one lateral bracket comprises a pair of lateral brackets spaced apart from one another.

16. The divan of claim 1, wherein the at least one upright comprises a pair of uprights spaced apart from one another.

17. The divan of claim 1, wherein the at least one forward seat bracket comprises a pair of forward seat brackets spaced apart from one another.

18. A divan, comprising:
an undercarriage comprising at least one lateral bracket, the lateral bracket having a lateral bracket front end and a lateral bracket rear end;
a seat pan pivotally and slidingly connected to the lateral bracket front end, the seat pan having a seat pan front end and a seat pan rear end;
a first track extending between the seat pan front end and the seat pan rear end of the seat pan;
at least one forward seat bracket pivotally connected adjacent to the lateral bracket front end and slidingly engaging the first track;
at least one upright, having an upright top end and an upright bottom end;
a second track defined by the upright between the upright top end and the upright bottom end;
a third track defined by the lateral bracket between the lateral bracket front end and the lateral bracket rear end; and
a backrest having a backrest top end and a backrest bottom end, the backrest being slidingly connected to the second track adjacent to the backrest top end;
wherein the seat pan is slidingly connected to the third track adjacent to the seat pan rear end,
wherein upon displacement of the seat pan between a divan upright seating position and a divan slouch seating position, the seat pan pivots and slides with respect to the lateral bracket front end, and the forward seat bracket pivots, and
wherein the seat pan rear end is pivotally connected to the backrest adjacent to the backrest bottom end such that movement of the seat pan is transmitted to the backrest so as to move together between the upright seating position and the slouch seating position.

19. The divan of claim 18, wherein the upright bottom end is connected to the lateral bracket rear end.

20. The divan of claim 18, wherein the third track defines at least three seating positions, the upright seating position for taxi, take-off, and landing, the slouch seating position, and a berth seating position.

21. The divan of claim 20, wherein the third track is essentially V-shaped with a first end defining the upright seating position, an intermediate dip defining the slouch seating position, and a second end defining the berth seating position.

22. The divan of claim 21, wherein a position of the rear end of the seat pan follows the shape of the third track.

23. The divan of claim 20, wherein the upright seating position is defined by the backrest at an angle between about 19-29° from a vertical line perpendicular to a floor of the aircraft and is defined by the seat at an angle between about 0-10° from a horizontal line parallel to the floor.

24. The divan of claim 23, wherein the upright seating position is defined by the backrest at an angle between about 21.5-26.5° from a vertical line perpendicular to the floor and is defined by the seat at an angle between about 2.5-7.5° from a horizontal line parallel to the floor.

25. The divan of claim 24, wherein the upright seating position is defined by the backrest at an angle about 24° from a vertical line perpendicular to the floor and is defined by the seat at an angle about 5° from a horizontal line parallel to the floor.

26. The divan of claim 20, wherein the slouch seating position is defined by the backrest at an angle between about 30-40° from a vertical line perpendicular to the floor and is defined by the seat at an angle between about 5-15° from a horizontal line parallel to the floor.

27. The divan of claim 26, wherein the slouch seating position is defined by the backrest at an angle between about 32.5-37.5° from a vertical line perpendicular to the floor and is defined by the seat at an angle between about 7.5-12.5° from a horizontal line parallel to the floor.

28. The divan of claim 27, wherein the slouch seating position is defined by the backrest at an angle about 35° from a vertical line perpendicular to the floor and is defined by the seat at an angle about 10° from a horizontal line parallel to the floor.

29. The divan of claim 18, further comprising:
at least one rear seat bracket connected, at a first end, adjacent to the seat pan rear end and, at a second end, slidingly engaging the third track.

30. The divan of claim 29, wherein the at least one rear seat bracket comprises a pair of rear seat brackets spaced apart from one another.

31. The divan of claim 18, further comprising:
at least one backrest bracket, at one end, being connected adjacent to the backrest top end and, at the other end, slidingly engaging the second track.

32. The divan of claim 18, wherein the at least one lateral bracket comprises a pair of lateral brackets spaced apart from one another.

33. The divan of claim 18, wherein the at least one upright comprises a pair of uprights spaced apart from one another.

34. The divan of claim 18, wherein the at least one forward seat bracket comprises a pair of forward seat brackets spaced apart from one another.

35. A divan, comprising:
an undercarriage comprising at least one lateral bracket, the lateral bracket having a lateral bracket front end and a lateral bracket rear end;
a seat pan pivotally connected to the lateral bracket front end, the seat pan having a seat pan front end and a seat pan rear end;
a first track extending between the seat pan front end and the seat pan rear end of the seat pan;
at least one forward seat bracket pivotally connected adjacent to the lateral bracket front end and slidingly engaging the first track;
at least one upright, having an upright top end and an upright bottom end;
a second track defined by the upright between the upright top end and the upright bottom end;
a third track defined by the lateral bracket between the lateral bracket front end and the lateral bracket rear end; and
a backrest having a backrest top end and a backrest bottom end, the backrest being slidingly connected to the second track adjacent to the backrest top end,
wherein the seat pan is slidingly connected to the third track adjacent to the seat pan rear end,
wherein the seat pan pivots about the lateral bracket front end and the forward seat bracket pivots upon displacement of the seat pan between a divan upright seating position and a divan slouch seating position, and
wherein the seat pan rear end is pivotally connected to the backrest adjacent to the backrest bottom end such that movement of the seat pan is transmitted to the backrest so as to move together between the upright seating position and the slouch seating position.

36. The divan of claim 35, wherein the upright bottom end is connected to the lateral bracket rear end.

37. The divan of claim 35, wherein the third track defines at least three seating positions, the upright seating position for taxi, take-off, and landing, the slouch seating position, and a berth seating position.

38. The divan of claim 37, wherein the third track is essentially V-shaped with a first end defining the upright seating position, an intermediate dip defining the slouch seating position, and a second end defining the berth seating position.

39. The divan of claim 38, wherein a position of the rear end of the seat pan follows the shape of the third track.

40. The divan of claim 37, wherein the upright seating position is defined by the backrest at an angle between about 19-29° from a vertical line perpendicular to a floor of the aircraft and is defined by the seat at an angle between about 0-10° from a horizontal line parallel to the floor.

41. The divan of claim 40, wherein the upright seating position is defined by the backrest at an angle between about 21.5-26.5° from a vertical line perpendicular to the floor and is defined by the seat at an angle between about 2.5-7.5° from a horizontal line parallel to the floor.

42. The divan of claim 41, wherein the upright seating position is defined by the backrest at an angle about 24° from a vertical line perpendicular to the floor and is defined by the seat at an angle about 5° from a horizontal line parallel to the floor.

43. The divan of claim 37, wherein the slouch seating position is defined by the backrest at an angle between about 30-40° from a vertical line perpendicular to the floor and is defined by the seat at an angle between about 5-15° from a horizontal line parallel to the floor.

44. The divan of claim 43, wherein the slouch seating position is defined by the backrest at an angle between about 32.5-37.5° from a vertical line perpendicular to the floor and is defined by the seat at an angle between about 7.5-12.5° from a horizontal line parallel to the floor.

45. The divan of claim 44, wherein the slouch seating position is defined by the backrest at an angle about 35° from a vertical line perpendicular to the floor and is defined by the seat at an angle about 10° from a horizontal line parallel to the floor.

46. The divan of claim 35, further comprising:
at least one rear seat bracket connected, at a first end, adjacent to the seat pan rear end and, at a second end, slidingly engaging the third track.

47. The divan of claim 46, wherein the at least one rear seat bracket comprises a pair of rear seat brackets spaced apart from one another.

48. The divan of claim 35, further comprising:
at least one backrest bracket, at one end, being connected adjacent to the backrest top end and, at the other end, slidingly engaging the second track.

49. The divan of claim 35, wherein the at least one lateral bracket comprises a pair of lateral brackets spaced apart from one another.

50. The divan of claim 35, wherein the at least one upright comprises a pair of uprights spaced apart from one another.

51. The divan of claim 35, wherein the at least one forward seat bracket comprises a pair of forward seat brackets spaced apart from one another.

* * * * *